United States Patent
Cypher

(10) Patent No.: US 7,571,252 B2
(45) Date of Patent: Aug. 4, 2009

(54) COMPUTER SYSTEM WITH MULTIPLE CLASSES OF TRANSACTION IDS

(75) Inventor: Robert E. Cypher, Saratoga, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 1238 days.

(21) Appl. No.: 10/385,356

(22) Filed: Mar. 10, 2003

(65) Prior Publication Data

US 2004/0205195 A1  Oct. 14, 2004

(51) Int. Cl.
*G06F 15/16* (2006.01)

(52) U.S. Cl. .............. 709/246; 709/201; 709/202; 709/203; 719/312; 719/313

(58) Field of Classification Search .......... 709/228, 709/246, 201–203; 719/312–313
See application file for complete search history.

(56) References Cited

U.S. PATENT DOCUMENTS

| | | | | |
|---|---|---|---|---|
| 4,814,979 A | * | 3/1989 | Neches | 718/106 |
| 6,212,550 B1 | * | 4/2001 | Segur | 709/206 |
| 6,332,165 B1 | * | 12/2001 | Hagersten et al. | 709/238 |
| 6,820,125 B1 | * | 11/2004 | Dias et al. | 709/229 |
| 7,028,299 B1 | * | 4/2006 | Chang | 718/104 |
| 7,376,793 B2 | * | 5/2008 | Cypher et al. | 711/140 |
| 2005/0251599 A1 | * | 11/2005 | Hum et al. | 710/100 |

OTHER PUBLICATIONS

Improving Token Coherence by Multicast Coherence Messages Cuesta, B.; Robles, A.; Duato, J.; Parallel, Distributed and Network-Based Processing, 2008. PDP 2008. 16th Euromicro Conference on Feb. 13-15, 2008 pp. 269-273 [retreived from IEEE database Jun. 4, 2009].*
U.S. Appl. No. 10/385,330, entitled "Computer system with multiple classes of device IDs", Cypher, filed Mar. 10, 2003.

* cited by examiner

*Primary Examiner*—Ario Etienne
*Assistant Examiner*—Lashanya R Nash
(74) *Attorney, Agent, or Firm*—Meyertons, Hood, Kivlin, Kowert & Goetzel, P.C.; B. Noel Kivlin

(57) ABSTRACT

A computer system may include a sending device, a receiving device, and a network coupling the devices. The sending device may be configured to send a packet on the network in order to initiate a transaction. The sending device is configured to only encode a portion of a transaction ID identifying the transaction in the packet. The receiving device is configured to receive the packet from the network and to send a responsive packet to the sending device as part of the transaction. The receiving device is configured to encode all of the transaction ID in the responsive packet. The receiving device may generate the portion of the transaction ID not encoded in the packet by the sending device in response to the packet having a particular characteristic.

18 Claims, 5 Drawing Sheets

COMPUTER SYSTEM WITH MULTIPLE CLASSES OF TRANSACTION IDS

BACKGROUND OF THE INVENTION

1. Field of the Invention

This invention relates to the field of multiprocessor computer systems and, more particularly, to communication within multiprocessor computer systems.

2. Description of the Related Art

Multiprocessing computer systems include two or more processors that may be employed to perform computing tasks. A particular computing task may be performed upon one processor while other processors perform unrelated computing tasks. Alternatively, components of a particular computing task may be distributed among multiple processors to decrease the time required to perform the computing task as a whole.

Various components within a multiprocessing computer system may communicate with each other during operation. For example, various components may participate in a coherency protocol that involves sending and receiving communications. A popular architecture in commercial multiprocessing computer systems is a shared memory architecture in which multiple processors share a common memory. In shared memory multiprocessing systems, a cache hierarchy is typically implemented between the processors and the shared memory. In order to maintain the shared memory model, in which a particular address stores exactly one data value at any given time, shared memory multiprocessing systems employ cache coherency. Generally speaking, an operation is coherent if the effects of the operation upon data stored at a particular memory address are reflected in each copy of the data within the cache hierarchy. For example, when data stored at a particular memory address is updated, the update may be supplied to the caches that are storing copies of the previous data. Alternatively, the copies of the previous data may be invalidated in the caches such that a subsequent access to the particular memory address causes the updated copy to be transferred from main memory or from a cache.

Various communications may be sent between components of a multiprocessing computer system in order to, for example, implement a coherency protocol. As the size of each communication increases, the amount of network bandwidth necessary to send communications also increases, which may in turn increase the cost of the multiprocessing system. Accordingly, it is desirable to be able to reduce the amount of information included in communications sent between components.

SUMMARY

Various embodiments of systems and methods that implement multiple classes of transaction IDs are disclosed. In one embodiment, a computer system may include a sending device, a receiving device, and a network coupling the devices. The sending device may be configured to send a packet on the network in order to initiate a transaction. The sending device is configured to only encode a portion of a transaction ID identifying the transaction in the packet. The receiving device is configured to receive the packet from the network and to send a responsive packet to the sending device as part of the transaction. The receiving device is configured to encode all of the transaction ID in the responsive packet. The receiving device may generate the portion of the transaction ID not encoded in the packet by the sending device in response to the packet having a particular characteristic. In some embodiments, the sending device may be configured to assign a transaction ID, which includes a subset ID and a packet characteristic ID, to each transaction initiated by the sending device. A subset ID portion of a transaction ID assigned to one transaction may have the same value as a subset ID portion of another transaction's transaction ID.

BRIEF DESCRIPTION OF THE DRAWINGS

A better understanding of the present invention can be obtained when the following detailed description is considered in conjunction with the following drawings, in which.

Figure 1:
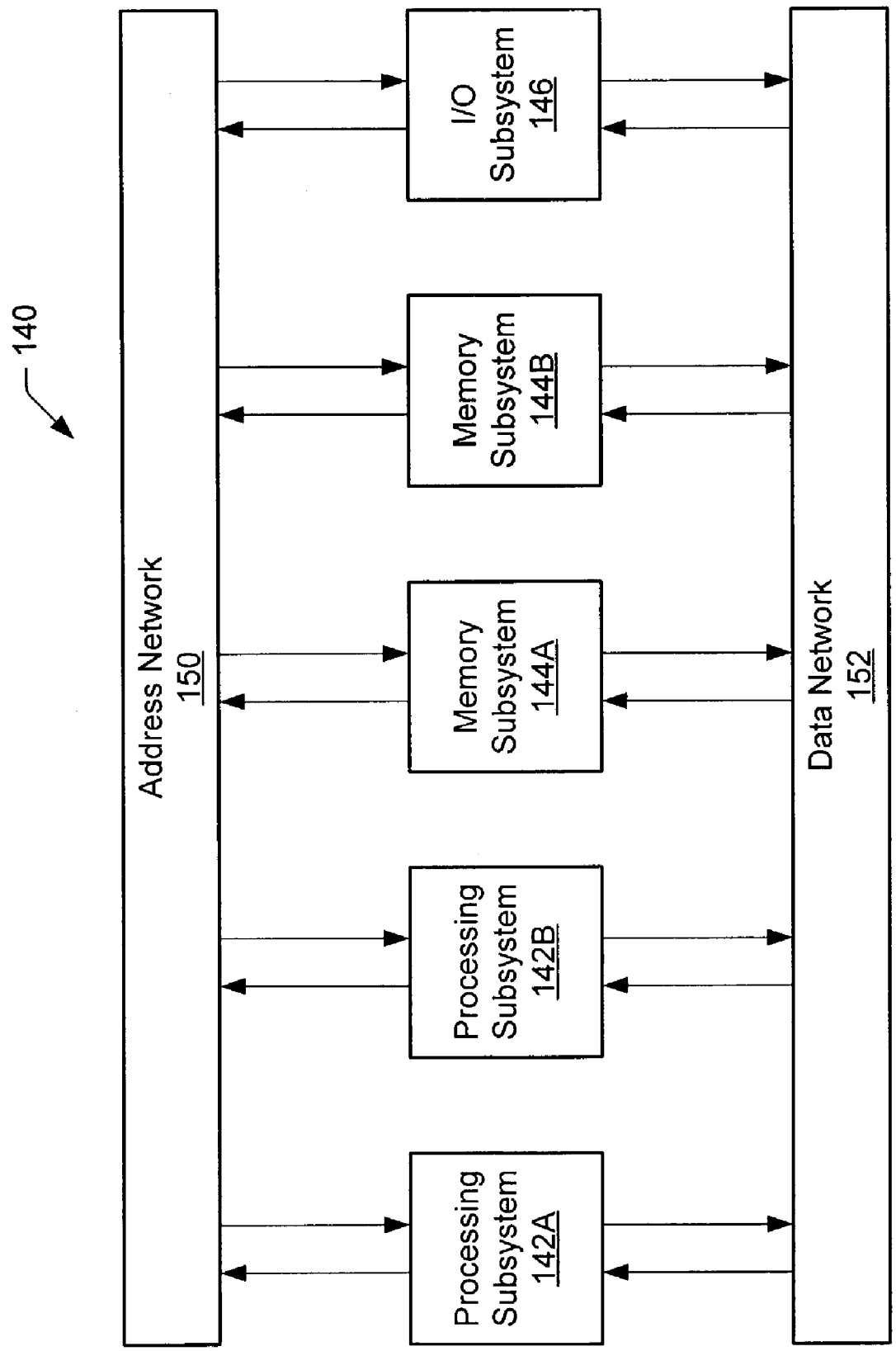
FIG. 1 is a block diagram of a multiprocessing computer system, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Computer System

FIG. 1 shows a block diagram of one embodiment of a computer system 140 that may implement multiple classes of transaction IDs. Computer system 140 includes processing subsystems 142A and 142B, memory subsystems 144A and 144B, and an I/O subsystem 146 interconnected through an address network 150 and a data network 152. Each of processing subsystems 142, memory subsystems 144, and I/O subsystem 146 may be referred to as a client device or subsystem. It is noted that although five client devices are shown in FIG. 1, embodiments of computer system 140 employing any number of client devices are contemplated. Elements referred to herein with a particular reference number followed by a letter may be collectively referred to by the reference number alone. For example, processing subsystems 142A-142B may be collectively referred to as processing subsystems 142.

Each of processing subsystems 142 and I/O subsystem 146 may access memory subsystems 144. Devices configured to perform accesses to memory subsystems 144 are referred to herein as "active" devices. Because each active device within computer system 140 may access data in memory subsystems 144, potentially caching the data, memory subsystems 144 and active devices such as processing systems 142 may implement a coherency protocol in order to maintain data coherency. Each client in FIG. 1 may be configured to participate in the coherency protocol by sending address messages on address network 150 and data messages on data network 152 using split-transaction packets. Similar address and/or data packets may be used to participate in other protocols.

Memory subsystems 144 are configured to store data and instruction code for use by processing subsystems 142 and I/O subsystem 146. Memory subsystems 144 may include dynamic random access memory (DRAM), although other types of memory may be used in some embodiments.

I/O subsystem 146 is illustrative of a peripheral device such as an input-output bridge, a graphics device, a networking device, etc. In some embodiments, I/O subsystem 146 may include a cache memory subsystem similar to those of processing subsystems 142 for caching data associated with addresses mapped within one of memory subsystems 144.

In one embodiment, data network 152 may be a logical point-to-point network. Data network 152 may be implemented as an electrical bus, a circuit-switched network, or a packet-switched network. In embodiments where data network 152 is a packet-switched network, packets may be sent through the data network using techniques such as wormhole, store and forward, or virtual cut-through. In a circuit-switched network, a particular client device may communicate directly with a second client device via a dedicated point-to-point link that may be established through a switched interconnect mechanism. To communicate with a third client device, the particular client device utilizes a different link as established by the switched interconnect than the one used to communicate with the second client device. Messages upon data network 152 are referred to herein as data packets.

Address network 150 accommodates communication between processing subsystems 142, memory subsystems 144, and I/O subsystem 146. Messages upon address network 150 are generally referred to as address packets. When an address packet references a storage location within a memory subsystem 144, the referenced location may be specified via an address conveyed within the address packet upon address network 150. Subsequently, data corresponding to the address packet on the address network 150 may be conveyed upon data network 152. In one embodiment, address packets may correspond to requests for an access right (e.g., a readable or writable copy of a cacheable coherency unit) or requests to perform a read or write to a non-cacheable memory location. Thus, address packets may be sent by an active device in order to initiate a coherency transaction. Subsequent address packets may be sent by other devices in order to implement the access right and/or ownership changes needed to satisfy the coherence request. In the computer system 140 shown in FIG. 1, a coherency transaction may include one or more packets upon address network 150 and data network 152. Typical coherency transactions involve one or more address and/or data packets that implement data transfers, ownership transfers, and/or changes in access privileges. Communications upon address network 150 may be point-to-point or broadcast, depending on the embodiment. Note that in some embodiments, address network and data network 152 may be implemented using the same physical interconnect.

Classes of Transaction IDs

As noted above, transactions may involve several address and/or data packets. When communicating with other client devices, client devices may encode transaction IDs into packets to identify the transactions of which those packets are a part. The client device that initiates a transaction may initially assign a unique transaction ID to that transaction. The initiating client device may encode at least a portion of the assigned transaction ID into the packet sent to initiate the transaction. Other client devices may encode the transaction ID in other packets that are sent as part of that transaction. If the initiating device has several outstanding transactions, the initiating device may use the transaction IDs included in subsequently received packets to match those packets to outstanding transactions. As a transaction completes, the initiating client device may free the transaction ID associated with that transaction. Free transaction IDs may then be assigned to new transactions initiated by that device. Since each outstanding transaction has a unique transaction ID with respect to other outstanding transactions initiated by the same client device, the number of bits included in each transaction ID may control how many outstanding transactions a client device can have.

The same transaction IDs may be used by different client devices in some embodiments. For example, processing subsystem 142A may have outstanding transactions identified by transaction IDs 1, 5, 8, 9, and 12 at the same time that processing subsystem 142B has outstanding transactions identified by transaction IDs 2, 5, 6, 7, 8, and 9.

Figure 2:
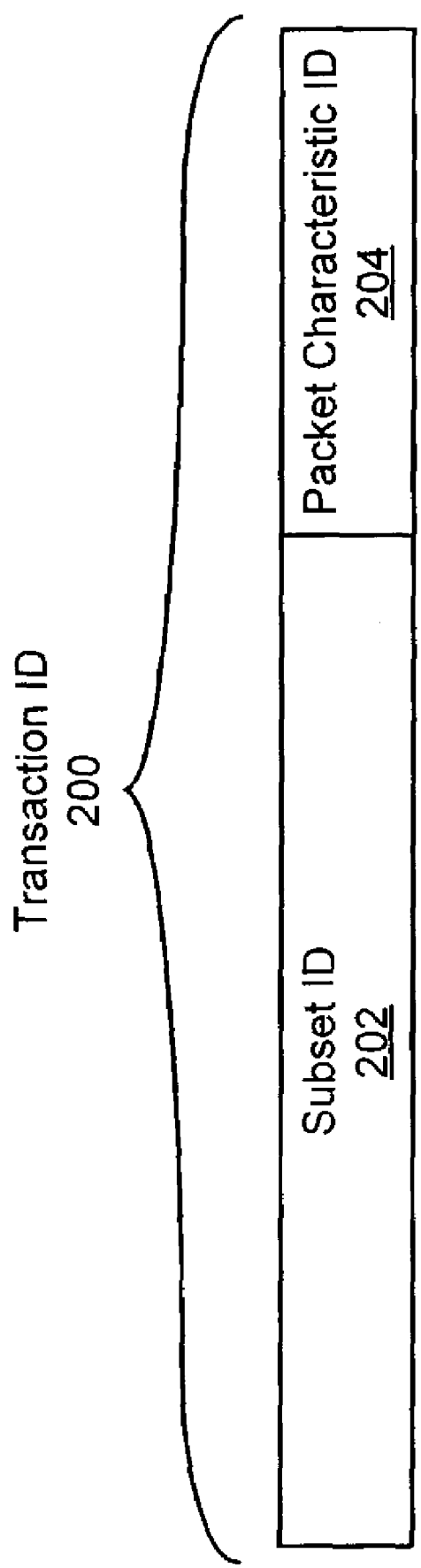
FIG. 2 illustrates a transaction ID, according to one embodiment.

FIG. 2 illustrates an exemplary transaction ID 200 that may be used in one embodiment. The transaction ID 200 of FIG. 2 includes a subset ID 202 and a packet characteristic ID 204. The packet characteristic ID 204 identifies a particular characteristic of a packet in which all or part of the transaction ID 200 is encoded. Each transaction initiated by a packet having the same characteristic is identified by a transaction ID having the same packet characteristic ID.

Transactions may be grouped into classes based on whether each transaction is initiated by sending a packet having a particular characteristic. For example, if a transaction is initiated by sending a packet having that characteristic, the transaction belongs to one class. If the transaction cannot be initiated by sending a packet having that characteristic, the transaction belongs to another class. More than one packet characteristic may be used to classify transactions in some embodiments. Packet characteristic ID 204 may identify features such as a type of command encoded in the packet and/or an address range encoded in the packet. For example, packet characteristic ID 204 may identify whether a packet includes a read command or a write command. Packet characteristic ID 204 may instead (or additionally) indicate whether the packet includes an address within a particular address range.

Each transaction initiated by sending a packet having a particular characteristic may have a unique subset ID 202 with respect to other outstanding (i.e., uncompleted) transactions in the same transaction class that are initiated by the same initiating device. Transactions in different classes, which have different packet characteristic IDs 204, may have the same subset ID 202. For example, if there are seven bits of subset ID information in each transaction ID, there may be up to 128 uniquely identifiable outstanding transactions in each transaction class at each client device. An outstanding transaction within each transaction class may include a transaction ID having a particular subset ID 202, such as 0001101. Accordingly, the same subset ID 202 may be used to identify transactions in different classes.

The amount of packet characteristic ID 204 and subset ID 202 information included in a transaction ID 200 may also vary among embodiments. The subset ID 202 may be sized to be able to uniquely identify a desired number of outstanding transactions at a particular client device. For example, if it is desirable to be able to uniquely identify up to 256 outstanding transactions per transaction class, there may be at least eight bits of subset ID 202 information. Note that some client devices may tend to have substantially fewer outstanding transactions than other client devices. However, subset IDs 202 may be uniformly sized for all of the client devices in many embodiments. The amount of packet characteristic ID 204 information may depend, at least in part, on the number of transaction classes included in a particular embodiment. For example, a single bit of packet characteristic 204 information may be used to differentiate between classes if only two transaction classes are implemented.

Use of transaction IDs 200 that include packet characteristic IDs 204 and subset IDs 202 may allow more efficient communications in some embodiments. For example, in many embodiments, only packets having a particular characteristic may be used to initiate a particular class of transaction. Accordingly, whenever a device sends a packet to initiate that particular class of transaction, that device may be configured to only encode the subset ID 202 of that transaction ID in the packet. Recipient devices may regenerate the excluded packet characteristic ID 204 based on the class of transaction initiated by that packet. When responding to the initiating device (e.g., by sending other address and/or data packets), these devices may encode the full transaction ID in the responsive packets. For example, in one embodiment, two transaction classes, read and write transactions, may be defined. The type of command (read or write) encoded in a packet is the packet characteristic that indicates the transaction class. Since only two transaction classes are implemented, packet characteristic IDs 204 may be a single bit in size. A packet characteristic ID 204 value of 1 may indicate a read transaction and a value of 0 may indicate a write transaction. If a client device sends a read-to-own address packet initiating a read transaction, the client device may only encode the subset ID 202 in the packet. Recipient devices may identify that the packet initiates a read transaction (e.g., by examining the type of command included in the packet) and responsively identify the packet characteristic ID 204 of that packet as having a value of 1. When encoding the packet's transaction ID in responsive packets that are part of the read transaction, these devices may encode both the packet characteristic ID 204 (having a value of 1) and the subset ID 202 received in the initiating packet.

As another example of how a recipient device may regenerate the packet characteristic ID 202 portion of a transaction ID 200, consider another embodiment in which the most significant bit of all read commands has a value of 1 and the most significant bit of all write commands has a value of 0. Two transaction classes, read transactions (packet characteristic 204=1) and write transactions (packet characteristic 204=0), may be implemented. In such an embodiment, the most significant bit of the command encoding may always have the same value as the packet characteristic 204 bit. Based on whether the command encoding in a received packet identifies a read or write transaction (as indicated by the most significant bit of the command encoding), a recipient device may regenerate the packet characteristic 204 bit of the transaction ID as having the same value as the most significant bit of the command encoding. If the recipient device sends any responsive packets as part of the transaction, the recipient device may thus encode the full transaction ID in any responsive packets.

Since the packet characteristic ID 204 may not be included in at least some packets, the size of those packets may be reduced. Alternatively, at least some of the room freed by not including the packet characteristic ID 204 in such a packet may be used to include other information, such as additional bit(s) used in an error detection and/or correcting code.

Figure 3:
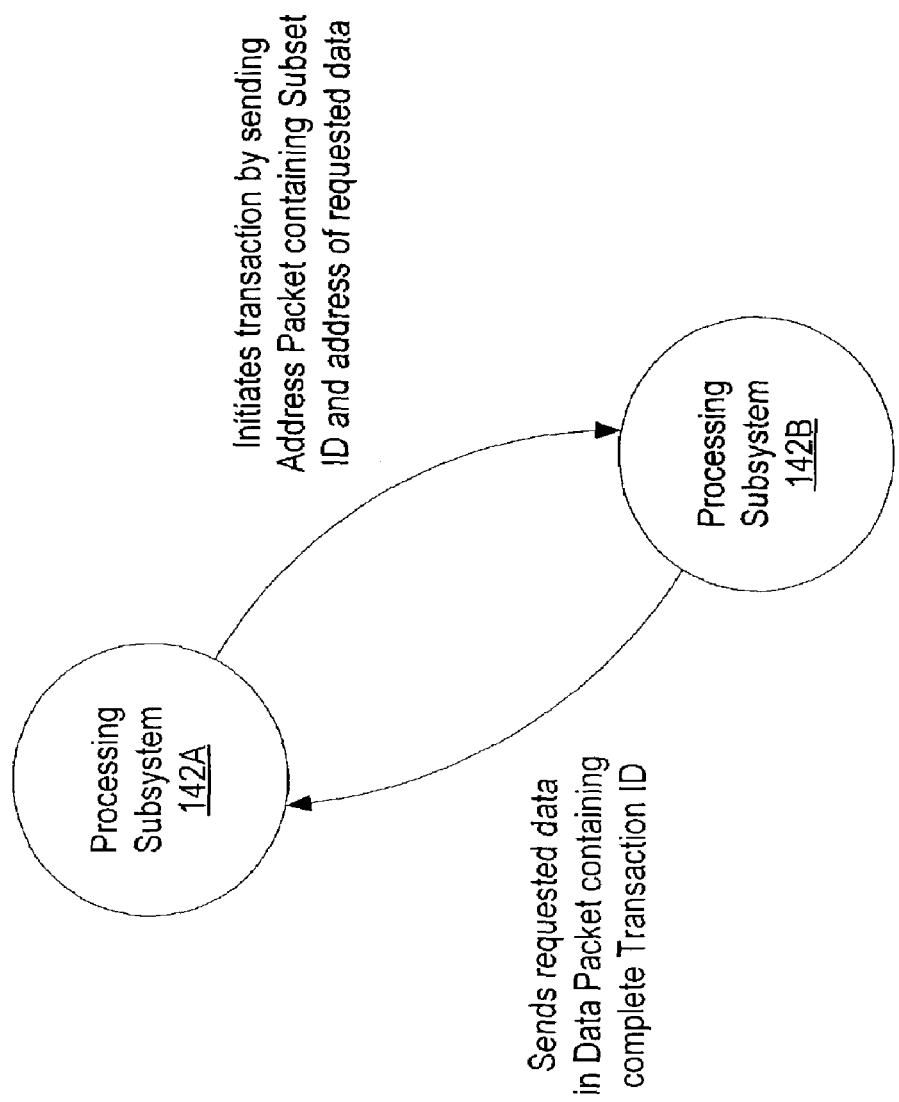
FIG. 3 shows an exemplary exchange of packets between devices, according to one embodiment.
Figure 4:
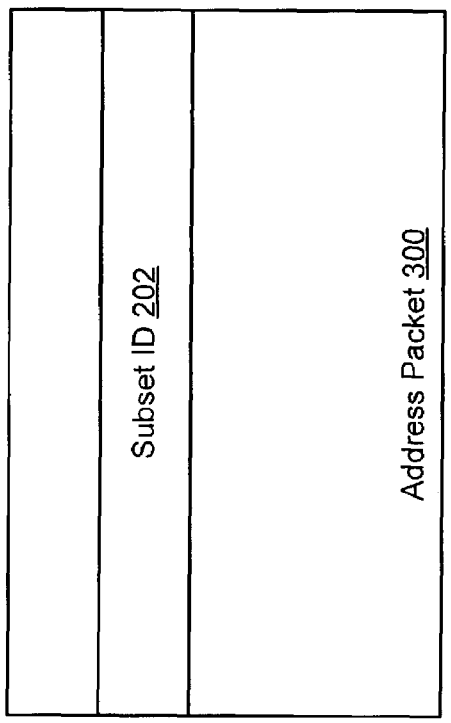
FIG. 4 illustrates an address packet in which only a portion of a transaction ID has been encoded, according to one embodiment.
Figure 5:
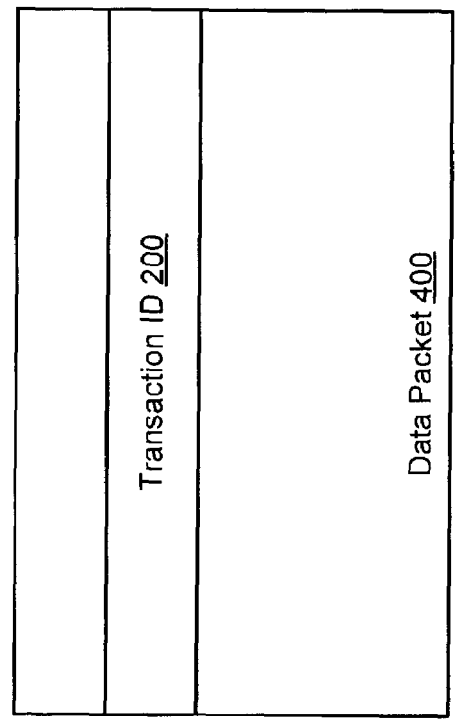
FIG. 5 illustrates a data packet in which a full transaction ID has been encoded, according to one embodiment.

FIGS. 3-5 illustrate how devices may use transaction IDs 200 when communicating exemplary address and data packets in one embodiment. FIG. 3 illustrates how a device 142B may send a data packet to device 142A in response to receiving an address packet from device 142A. The initiating device 142A may initiate a coherency transaction by requesting access to a particular cache line by sending an address packet specifying that cache line and the requested access right. If the receiving device 142B is responsible for providing the initiating device with a copy of the specified cache line in response to such a request, the receiving device 142B may send a responsive data packet containing a copy of the specified cache line to the initiating device. Note that the address packet sent by the initiating device 142A may be handled by one or more intervening devices (e.g., a memory subsystem 144) before being provided to receiving device 142B in some embodiments.

In the embodiment of FIG. 3, characteristics of the address packet sent by device 142A depend on the class of coherency transaction being initiated. Accordingly, any address packet having that characteristic belongs to a particular transaction class. Since the transaction class may be readily determined by receiving devices based on characteristics of the packet, the sending device 142A may only encode the subset ID 202 portion of the packet's transaction ID 200 in the address packet 300, as shown in FIG. 4.

Since the initiating device may have sent more than one packet with the same subset ID 202, the receiving device 144B may be configured to encode the entire transaction ID 200 in the data packet 400 returned to the initiating device, as shown in FIG. 5. The transaction ID 200 included in the data packet 400 is used by device 142A in order to identify the transaction of which the data packet 400 is a part.

Figure 6:
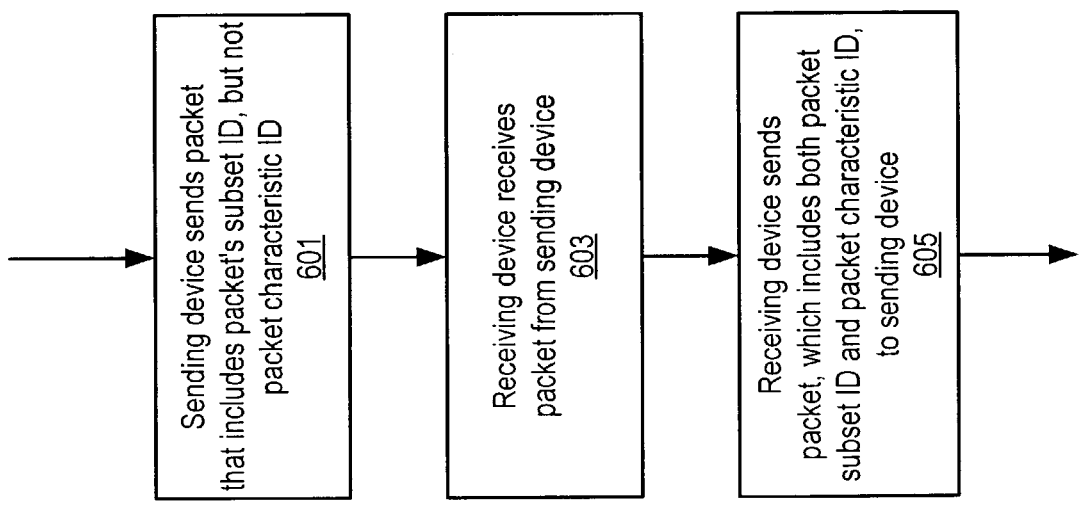
FIG. 6 is a flowchart of a method of operating a multiprocessing computer system, according to one embodiment.

FIG. 6 is a flowchart of one embodiment of a method of communicating between devices in a computer system. A sending device may identify each transaction initiated by that device by a transaction ID. At 601, the sending device sends a packet to initiate a transaction. The packet only includes a portion of that packet's transaction ID. In particular, the packet does not include a packet characteristic ID portion of the transaction ID. The packet may have a particular characteristic, and all transactions in a particular class may be initiated by sending packets having that particular characteristic. In contrast, no transaction in any other class may be initiated by sending packets having that particular characteristic. Accordingly, the transaction class of the packet may be determined based on the presence or lack of the packet characteristic in that packet.

At 603, a receiving device receives the packet sent by the sending device. The receiving device may generate a responsive packet that includes the full transaction ID of the sending device. The receiving device may generate the full transaction ID of the sending device from the subset ID included in the packet received at 603 and transaction class implied by the packet having the particular characteristic. The receiving device may send the responsive packet to the sending device, as indicated at 605.

In some embodiments, the sending device may selectively encode either a full transaction ID or only a subset ID in a packet dependent on whether the packet has that characteristic. For example, when the sending device is sending a packet to initiate a transaction and the packet has a characteristic identifiable by the packet characteristic ID, the sending device may encode only a portion of the transaction ID. In contrast, when the sending device is sending a packet as part of transaction initiated by another device, the sending device may encode the entire transaction ID.

Numerous variations and modifications will become apparent to those skilled in the art once the above disclosure is fully appreciated. It is intended that the following claims be interpreted to embrace all such variations and modifications.

What is claimed is:

1. A computer system, comprising:
   a first client device;
   a second client device;
   a network interconnecting the first and second client devices;
   wherein the first client device is configured to initiate a first coherency transaction by sending a packet to the second client device via the network;
   wherein the first coherency transaction is associated with a transaction ID including a subset ID and a packet characteristic ID, wherein the subset ID identifies a unique one of a plurality of outstanding transactions within a class of the first coherency transaction at each of the first and second client devices;
   wherein the first client device is configured to include the subset ID within and to exclude the packet characteristic ID from the packet sent to the second client device;
   wherein the second client device is configured to respond to the first coherency transaction by generating the packet characteristic ID dependent upon information encoded in the packet sent by the first client device and to send a responsive packet to the first client device via the network, wherein the responsive packet comprises the transaction ID including the subset ID and the packet characteristic ID; and
   wherein the first client device is configured to associate the responsive packet with the first coherency transaction based on the transaction ID including the subset ID and the packet characteristic ID.

2. The computer system as recited in claim 1, wherein the packet characteristic ID identifies whether the first coherency transaction is a read transaction or a write transaction.

3. The computer system as recited in claim 1, wherein the packet characteristic ID indicates whether the packet includes an address within a particular address range.

4. The computer system as recited in claim 1, wherein the first client device is configured to initiate a second coherency transaction that is pending concurrently with the first coherency transaction, and wherein the second coherency transaction is associated with a second transaction ID including an associated subset ID and an associated packet characteristic ID.

5. The computer system as recited in claim 4, wherein the first client device is configured to generate a value for the subset ID associated with the second transaction ID that is the same as a value of the subset ID associated with the first transaction ID.

6. The computer system as recited in claim 1, wherein the network comprises an address network and a data network, wherein the first client device is configured to send the packet on the address network to initiate the first coherency transaction for a cache line, and wherein the second device is configured to send the responsive packet on the data network, wherein the responsive packet includes a copy of the cache line.

7. The computer system as recited in claim 1, wherein the first client device is configured to use the transaction ID included in subsequently received packets to match the subsequently received packets to the first coherency transaction.

8. The computer system as recited in claim 7, wherein the first client device is configured to free the transaction ID associated with the first coherency transaction in response to completion of the first coherency transaction.

9. The computer system as recited in claim 8, wherein the first client device is configured to assign the transaction ID to a new coherency transaction initiated by the first client device after completion of the first coherency transaction.

10. A method comprising:
    a first client device initiating a first coherency transaction by sending a packet to a second client device via a network, wherein the first coherency transaction is associated with a transaction ID including a subset ID and a packet characteristic ID, wherein the subset ID identifies a unique one of a plurality of outstanding transactions within a class of the first coherency transaction, and wherein the packet sent to the second client device from the first client device includes the subset ID and excludes the packet characteristic ID;
    the second client device responding to the first coherency transaction by generating the packet characteristic ID dependent upon information encoded in the packet sent by the first client device, and sending a responsive packet to the first client device via the network, wherein the responsive packet comprises the transaction ID including the subset ID and the packet characteristic ID; and
    the first client device associating the responsive packet with the first coherency transaction based on the transaction ID including the subset ID and the packet characteristic ID.

11. The method as recited in claim 10, wherein the packet characteristic ID identifies whether the first coherency transaction is a read transaction or a write transaction.

12. The method as recited in claim 10, wherein the packet characteristic ID indicates whether the packet includes an address within a particular address range.

13. The method as recited in claim 10, further comprising the first client device initiating a second coherency transaction that is pending concurrently with the first coherency transaction, wherein the second coherency transaction is associated with a second transaction ID including an associated subset ID and an associated packet characteristic ID.

14. The method as recited in claim 13, further comprising the first client device generating a value for the subset ID associated with the second transaction ID that is the same as a value of the subset ID associated with the first transaction ID.

15. The method as recited in claim 10, wherein the network comprises an address network and a data network, and wherein the method further comprises the first client device sending the packet on the address network to initiate the first coherency transaction for a cache line, and the second device sending the responsive packet on the data network, wherein the responsive packet includes a copy of the cache line.

16. The method as recited in claim 10, further comprising the first client device using the transaction ID included in subsequently received packets to match the subsequently received packets to the first coherency transaction.

17. The method as recited in claim 16, further comprising the first client device freeing the transaction ID associated with the first coherency transaction in response to completion of the first coherency transaction.

18. The method as recited in claim 17, further comprising the first client device assigning the transaction ID to a new coherency transaction initiated by the first client device after completion of the coherency transaction.

* * * * *